US012635817B1

(12) United States Patent
Holmes

(10) Patent No.: US 12,635,817 B1
(45) Date of Patent: May 26, 2026

(54) INTERACTIVE REFLECTION DEVICE

(71) Applicant: Mark F. Holmes, Philadelphia, PA (US)

(72) Inventor: Mark F. Holmes, Philadelphia, PA (US)

( * ) Notice: Subject to any disclaimer, the term of this patent is extended or adjusted under 35 U.S.C. 154(b) by 532 days.

(21) Appl. No.: 18/123,903

(22) Filed: Mar. 20, 2023

Related U.S. Application Data

(60) Provisional application No. 63/322,168, filed on Mar. 21, 2022.

(51) Int. Cl.
| | |
|---|---|
| *A47G 1/02* | (2006.01) |
| *A47G 1/16* | (2006.01) |
| *G06F 3/00* | (2006.01) |
| *G06F 3/02* | (2006.01) |
| *G06F 3/0488* | (2022.01) |
| *G06F 3/16* | (2006.01) |

(52) U.S. Cl.
CPC .............. *A47G 1/02* (2013.01); *A47G 1/166* (2013.01); *G06F 3/005* (2013.01); *G06F 3/0227* (2013.01); *G06F 3/0488* (2013.01); *G06F 3/167* (2013.01); *A47G 2001/1673* (2013.01); *A47G 2200/146* (2013.01)

(58) Field of Classification Search
CPC .. A47G 1/02; A47G 1/166; A47G 2001/1673; A47G 2200/146; G06F 3/005; G06F 3/0227; G06F 3/0488; G06F 3/167

USPC ........................................................ 434/30
See application file for complete search history.

(56) References Cited

U.S. PATENT DOCUMENTS

| | | | |
|---|---|---|---|
| 5,228,879 A | 7/1993 | Fromm | |
| 7,503,522 B2 | 3/2009 | Henley et al. | |
| 9,528,695 B2 | 12/2016 | Adachi et al. | |
| 9,968,264 B2 * | 5/2018 | Tzvieli ................. | A61B 5/411 |
| 2005/0156753 A1 | 7/2005 | DeLine et al. | |
| 2014/0195246 A1 | 7/2014 | Maynor | |
| 2018/0103851 A1 * | 4/2018 | Tzvieli ................. | G01J 5/0806 |

OTHER PUBLICATIONS

Selling Antiques, 19th Century Adjustable Height Cheval Dressing Mirror, 19thCenturyAdjHeightMirror.pdf, mirror publicly available as early as Jan. 1, 2020.
YOUTUBE video, https://www.youtube.com/watch?v=eNSj0wqqYD4. last accessed Mar. 15, 2023, screenshots attached.
Old Brochure made publicly available by the Applicant before Mar. 21, 2022.

* cited by examiner

*Primary Examiner* — Pierre E Elisca

(57) ABSTRACT

An interactive mirror, such as a height or length adjustable cheval-type mirror, which can be used to better the mental health of a user. The interactive mirror can give and reinforce positive affirmations to the user, particularly a child. The interactive mirror can grow as the user grows. The interactive mirror can recite a script that the user can be gently encouraged, taught, or rewarded to repeat. The interactive mirror can simultaneously reinforce a message visually, audibly, and vocally.

22 Claims, 3 Drawing Sheets

INTERACTIVE REFLECTION DEVICE

CROSS-REFERENCE TO RELATED APPLICATIONS

This application claims the benefit of U.S. Provisional Application No. 63/322,168, entitled Interactive Reflection Device, filed Mar. 21, 2022, which is hereby incorporated by reference in its entirety.

BACKGROUND OF THE INVENTION

1. Field of the Invention

Embodiments described herein generally relate to talking mirrors and learning or inspirational devices for users, such as children, young adults, female children and female young adults.

2. Other Technical Approaches

In general, illuminated, talking mirrors are known. A basic, voice activated, illuminated, talking mirror can inspire young children ages 2-6 with the power of positive affirmations, such as spoken affirmations and stories. Children repeating positive affirmations have become a media sensation. In fairytales, mirrors are used to look into the future. Mirrors of this type help a girl create a future with spoken affirmations and stories that will encourage and inspire her. These affirmations and stories transform an ordinary girl into a Super Girl who believes in herself and her potential. Mirrors of this type start a child's day by greeting her and suggesting things like jokes and sign along songs that the child can listen to that will help them make their day. With the touch of a girl's finger, she can choose the color of a rainbow, listen to a lullaby or have a calming bedtime story read to her.

Another example is United States Patent Publication No. 20140195246, hereby incorporated by reference in its entirety. The invention is a mirror with a recording and playback apparatus connected to the mirror. A user of the invention looks at her reflection in the mirror and activates the audio-emitting device in order to hear a pre-recorded message or song. The mirror has a first activation means, which can be voice-specific or sound-specific. The pre-recorded message plays through at least one broadcasting means, such as a speaker. The volume is controlled through a variable sound controlling means, such as a volume dial. The message is typically one of an encouragement and positive compliment to the user in order to enhance self-esteem. In the preferred embodiment, the audio-emitting device is substantially circular or oval-shaped. The user must actuate the device in order to emit the sound, which is intended to be a pre-determined recording such as song lyrics or spoken words. The audio-emitting device may be removable from the respective invention so that the various devices are interchangeable. The audio-emitting device may be any of those standard devices in the industry, such as those utilized in novelty greeting cards and interactive holiday display decorations, which require a user to perform a task such as opening the card or pressing a button to cause the sound to be emitted. In an alternative embodiment, a device may also contain a USB port for uploading a desired sound from a web-based system and database. Finally, in still another embodiment, a device may also have recording capabilities, for the purpose of hearing a personalized message. An instructive pre-recorded message would play for the user, such as a message to remind of appointments, or medication schedules. The user actuates the playback feature in order to hear the pre-recorded message played aloud. More than one message may be recorded. The preferred embodiment for the invention is for use by individuals with low self-esteem. The invention serves a role to improve self-image and as a therapeutic tool for depression. The invention provides a pre-recorded message of encouragement and reassurance, in order to help the user cope with everyday issues related to depression.

Height adjustable cheval-type mirrors are known as early as the 19th century.

U.S. Pat. No. 5,228,879 is hereby incorporated by reference in its entirety.

U.S. Pat. No. 9,528,695 is hereby incorporated by reference in its entirety.

United States Patent Publication No. 20050156753 is hereby incorporated by reference in its entirety.

SUMMARY OF THE INVENTION

One technical problem not solved by the prior art is an interactive reflective device or, more generally, an inspirational device that can be adapted to keep up with the mental growth, physical grown or both of a user, such as a child. Interest by a child in a prior art toy or other product can wane as a function of time, the age of the child, and/or repeated use of the prior art toy by the child. To help solve this technical problem, the present disclosure can include an interactive reflective device or inspirational device that can be changed, modified, updated, and adapted to the needs, special needs, physical growth, and emotional growth of the user, such as a child or a growing child.

For example, the interactive reflective device or inspirational device can include a mirror image region. The mirror image region can include one or more of a reflective portion of a mirror, a display region or area, or any area that displays or produces an image or mirror image of a user, such as a child. Mirror image can mean an image that has its parts arranged with a reversal of right and left. Mirror image can also mean an image that is a specular reflection or regular reflection. Mirror image can also mean a specular reflection or regular reflection. A mirror image can also mean a reflection of waves, such as light, from a surface, wherein a reflected ray of light emerges from the reflecting surface at the same angle to the surface normal as the incident ray, but on the opposing side of the surface normal in the plane formed by the incident and reflected rays. The mirror image region, a display device or both can be carried by one of a mirror or a first illuminated frame. The mirror image region can be adjusted in height, such as raised or lowered with respect to the floor or a base, so that eyes of a user can remain centered on, approximately centered on or remain at a similar spot or visual line, such as an eye level line, on the mirror image region during various stages of the user's physical growth. The mirror, mirror image region, the display region, and the inner frame, alone or in combination, can also be physically raised and lowered with respect to a floor. The interactive reflective device or inspirational device can be substantial, like a piece of furniture, which can be used for many years of the life of the user, such as a child or a younger sibling. Stated another way, the interactive reflective device or inspirational device can grow in physical height with the child.

But the interactive reflective device or inspirational device can also grow with the emotional or chronological age and maturity of the child. In one embodiment, affirmations, such as pre-recorded affirmations, can be changed, substituted, or replaced according to the gestational or mental or emotion age of the user. Rather than having just pre-recorded affirmations or songs or stories, which can become stale as the user ages or through repetition, the interactive reflective device or inspirational device can include or carry a speaker, such as a BLUETOOTH-enabled speaker or a WI-FI enabled speaker, which can receive and broadcast audio content in real time. The interactive reflective device or inspirational device can include a phone mount (configured for a smart phone) or a camera mount (configured for a camera, such as a camera that is or is not connected to the Internet) or a display region that can receive and display video content in real time. A parent, a sibling, a grown-up, or peer can communicate with a user in real time through a combination of the speaker and an audio data source, such as a microphone, smart phone, MP3 player, memory stick, external hard drive, flash memory, RAM, ROM, etc. For example, the child or other user can look at his or her likeness in the mirror image region while he/she or someone else reads a story in real-time. A father can wake up his child in the morning by linking the speaker to his phone, a microphone, etc. and gently speaking "Wake up, sleepyhead" into his phone. The speaker, a display region or both can also be used to play respective new or updated audio content, video content or both, such as YOUTUBE videos or live or pre-recorded content on an MP3 player, a smart phone, an external hard drive, a memory stick, or memory card, etc. The mirror can include a camera mount or smartphone mount so that the user can converse with other users in real-time, record themselves, or watch media content such as video through an external device. Conversely, children might be better served not being connected to the Internet, WI-FI, cellular service, etc. In these cases, embodiments described herein can be standalone units, disconnected from Internet connectivity.

Content can be further customized for a user through specialized data packages. Data packages can include text, spoken words, pictures, video, etc. from a role model of a user, such as a parent, a Supreme Court Justice, a sports legend, a doctor, a patent lawyer, a member of the clergy, a teacher, etc. Data packages can be prepared and licensed by the role model or a third party and then accessed directly or indirectly through the interactive reflective device or inspirational device.

Another unsolved technical problem is matching accessible content with the mood or emotion of a user. The interactive reflective device or inspirational device can include signal switches, on-off switches, or interface buttons each labeled "Happy" or "Sad." When the user, such as a child or female child presses the "Happy" interface button, the interactive reflective device or inspirational device can congratulate the child. Activation of the "Happy" interface button can also limit the pre-recorded or live content that the user can access. For example, content designed to cheer up a user can be automatically excluded. Conversely, activation of the "Sad" interface button can limit presented content to words, sounds, pictures, etc. that are designed to put the user in a good mood, such as be relaying a complement, a prior achievement, an encouraging message from a loved one, data that has made the user happier in the past, etc. Alternatively, pressing either of the "Happy" or "Sad" interface buttons can produce or permit access to identical content. The interactive reflective device or inspirational device can also keep track of how often the "Happy" or "Sad" interface buttons are selected over the course of a given time interval so that parents or guardians can be notified of potential self-esteem or depression issues or a pattern or patterns of self-esteem/depression issues over a given or specific time interval. For example, the interactive reflective device or inspirational device can be connected to a smart phone by WI-FI, BLUETOOTH, etc.

The interactive reflective device or inspirational device can include multi-lingual affirmations, such as one or more of English, Spanish, French, Chinese or other exemplary languages disclosed herein. Spoken affirmations can have a slower cadence or rhythm for children with learning or other cognitive disabilities.

The interactive reflective device or inspirational device can further include costume indicia, such as removable cutouts, appliques, static cling window film, etc. The costume indicia can be carried by the mirror or be positioned immediately adjacent to the mirror image region such that a user looking at his or her image can align his/her reflection or image with the costume indicia and pretend that the user is the character that matches the selected costume indicia.

The interactive reflection device can combine a visual component (such as a mirror image of a user), an audio component (an affirmation provided by the interactive reflection device) and a required vocal component (repetition of the affirmation provided by the interactive reflection device) to teach or reinforce a positive message or messages to a user.

The above and other features, elements, characteristics, steps, and advantages of the present invention will become more apparent from the following detailed description of the embodiments of the present invention with reference to the attached drawings.

DETAILED DESCRIPTION

Figure 1:
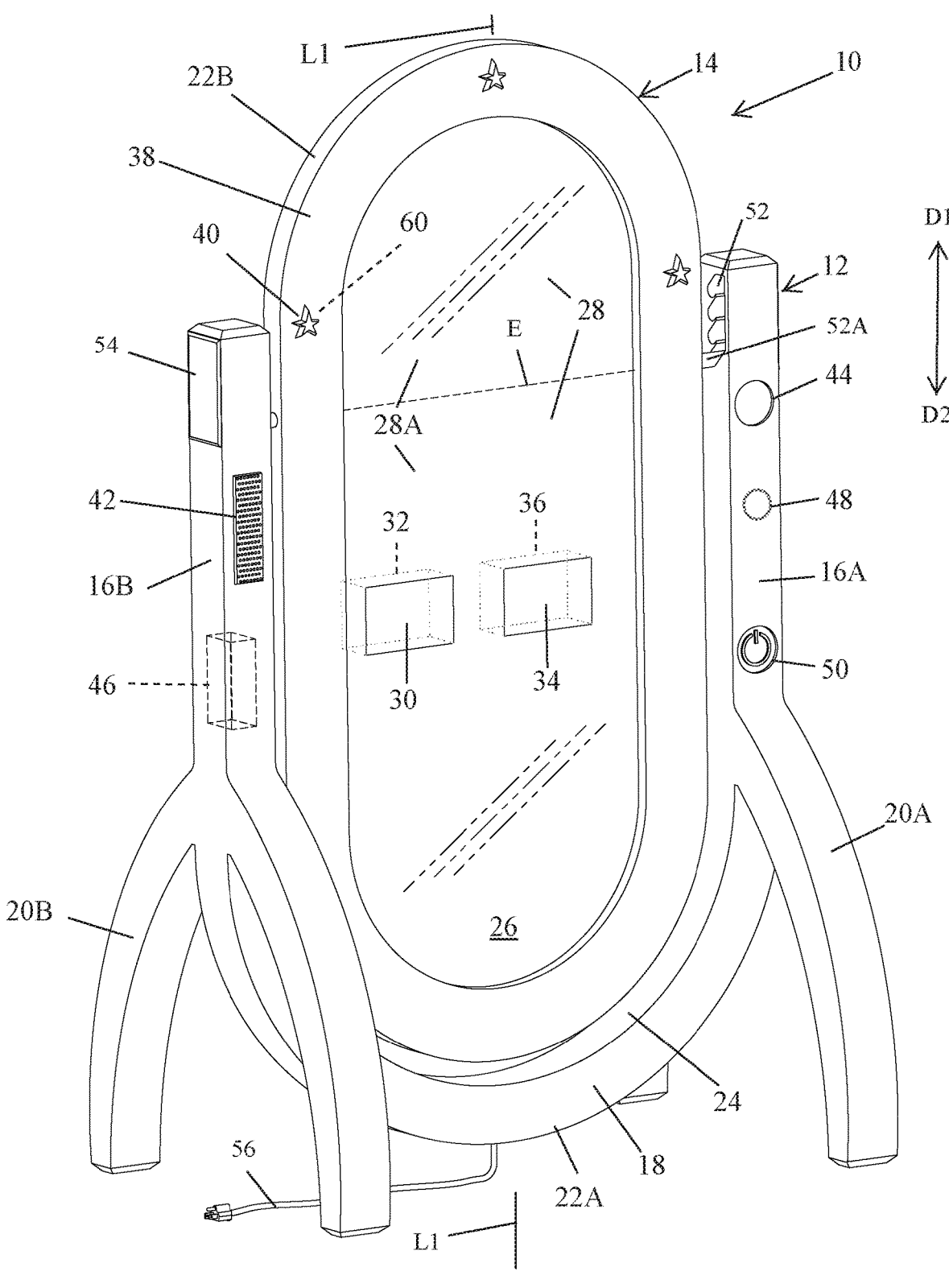
FIG. 1 is a perspective front view of a first embodiment inspirational device described herein.

In an exemplary embodiment, illustrated in FIGS. 1 and 2, a device, such as interactive reflective device or inspirational device, herein referred to below as inspirational device 10, can include at least one first part, such as at least one base or at least one outer frame 12 and at least one second part, such as at least inner frame 14. The inner frame 14 can be a first illuminated frame. The outer frame 12 can be a second illuminated frame. If inner and outer frames 14, 12 are both used, the inner frame 14 can be pivotably connected or otherwise movable with respect to the outer frame 12. In one embodiment, the outer frame 12 and the inner frame 14 can define a cheval type or floor type or free-standing type of mirror frame.

The outer frame 12 can include or define at least one first support, such as a first upright member 16A, at least one second support, such as a second upright member 16B, and at least one third support, such as a cross member 18. The cross member 18 can physically intersect or indirectly physically intersect each of the first and second upright members 16A, 16B, such as at common respective ends of each first and second upright members 16A, 16B. The first upright member 16A, the second upright member 16B and the cross member 18 can each be separate pieces or parts each made from a material or materials such as durable polymers, plastics, metals such as steel or aluminum, fiberglass, wood, any other suitable structural material known in the art or any combinations thereof. The first and second upright members 16A, 16B and the cross member 18 can each be joined together by laminating, fasteners, tongue and groove, dowels, adhesive, welding, etc. Alternatively, the first upright member 16A, the second upright member 16B and the cross member 18 can be a single monolithic structure made from a single piece of material, such as a durable polymer, plastic, metal such as steel or aluminum, fiberglass, wood, any other suitable structural material known in the art or any combinations thereof. In general, the first upright member 16A, the second upright member 16B and the cross member 18 can, in combination, form a U-shape or C-shape. The first upright member 16A and second upright member 16B can each be, or can each define, an elongated body. Each first upright member 16A, each second upright member 16 or both can be substantially straight or can define an angle or a curve. The cross member 18 can be substantially straight or can define at least one angle or at least one curve. The two upright members 16A, 16B can each be substantially parallel to one another, can be mirror images of one another about longitudinal axis L1 or both.

As shown, the outer frame 12 can have or define a first leg 20A, a second leg 20B or at least two legs such as first and second legs 20A, 20B. Each of the first and second legs 20A, 20B can be attached to a respective one or more of the upright member 16A, the upright member 16B and/or the cross member 18. As shown, the respective first and second legs 20A, 20B can be attached adjacent to a first outer end 22A of the outer frame 12. The first leg 20A, the second leg 20B or both can be replaced with one or more blocks or masses of material that help keep the interactive reflection device or inspirational device 10 or the first upright member 16A, the second upright member 16B or both in a generally upright position. In an alternative embodiment, the outer frame 12 can be omitted and one or more of the first and second legs 20A, 20B can be attached to the inner frame 14, extend from the inner frame 14 or be carried by the inner frame 14. In yet another embodiment, the first and second legs 20A, 20B can be omitted so that interactive refection device or inspirational device 10 or the inner frame 14 can be hung on a vertical surface, such as a wall or lean against a vertical surface, such as a wall. Each of the first and second legs 20A, 20B can have or define at least one respective free end. The first leg 20A can define at least two first free ends. The second leg 20B can define at least two second free ends. The first leg 20A can define a U-shape or a C-shape. The second leg 20B can define a U-shape or a C-shape. The first and second legs 20A, 20B can be identically sized, identically shaped or both.

Stated another way, the outer frame 12 can include at least two legs 20A, 20B, each fixedly attached to a respective end of a respective first or second upright member 16A, 16B. The at least two legs 20A, 20B can each be positioned adjacent to the first outer end 22A of the outer frame 12, opposite to a second outer end 22B. The first leg 20A and the first upright member 16A can be monolithic or a single piece. The second leg 20B and the second upright member 16B can be monolithic or a single piece. The first and second legs 20A, 20B can each be configured to engage the surface upon which the inspirational device 10 rests, such as a floor, a sink top, or another piece of furniture such as a dresser, etc.

The cross member 18 can be unitary with the first upright member 16A, the second upright member 16B and the first and second legs 20A, 20B. The outer frame 12, which can include the first upright member 16A, the second upright member 16B, the first and second legs 20A, 20B, and the cross member 18, can have a cross section of any polygonal shape such as a triangle, circle, or the like. As shown in FIG. 1, the outer frame 12 can define a rectangular cross section. In general, the outer frame 12 can support the inner frame 14. Neither the outer frame 12 nor the inner frame 14 need to take any shape, but can be circular, oval, square, rectangular, etc. in shape. The outer frame 12 can be manufactured from a variety of materials including, but not limited to, durable polymers, plastics, metals such as steel or aluminum, fiberglass, wood, any other suitable structural material known in the art or any combinations thereof.

One or more of the outer frame 12, the first upright member 16A, the second upright member 16B, the cross member 18, the first leg 20A, and/or the second leg 20B can carry internal illumination or external illumination, such that first part can function as a nightlight or lamp, in addition to or in place of any illumination carried by the inner frame 14.

Figure 2:
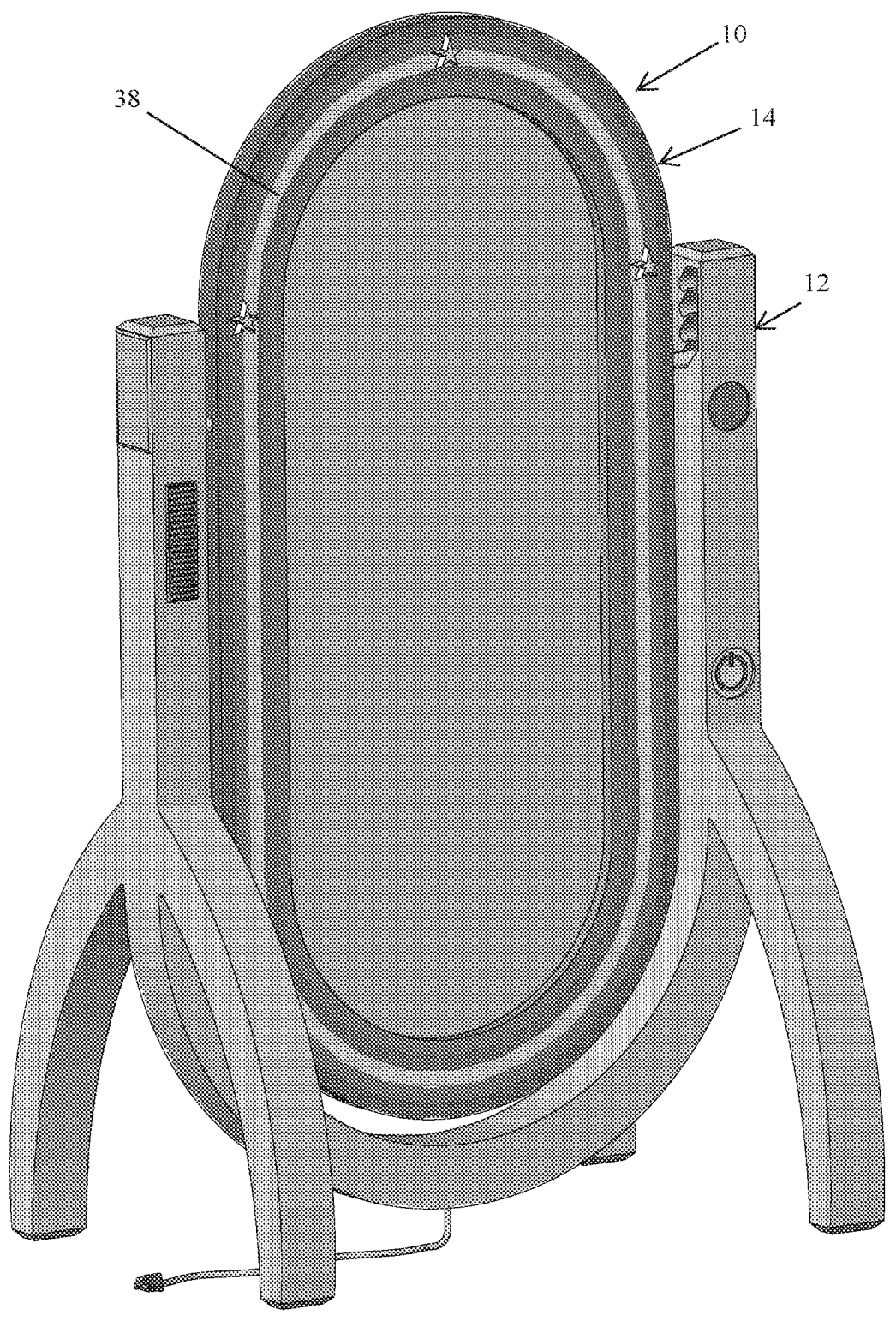
FIG. 2 is a perspective front grayscale view of the first embodiment inspirational device shown in FIG. 1.

With continuing reference to FIG. 1, the inner frame 14 can be a hollow body. The inner frame 14 can be contiguous with no ends or can also have one or more terminating ends. The inner frame 14 can be shaped as any polygonal shape such as a circle, rectangle, or the like, such as the flattened oval shape as shown in FIG. 1. The inner frame 14 can be constructed from a variety of materials including, but not limited to, durable polymers, plastics, metals such as steel or aluminum, fiberglass, wood, or any other suitable material known in the art or any combinations thereof. The inner frame 14 can be constructed from the same material or materials or from different material or materials as the outer frame 12. In an alternative embodiment, the inner frame 14 can include an aperture, a space, or a gap 24 that can be disposed between the outer frame 12 and the inner frame 14 or can be defined by the combination of the outer frame 12 and the inner frame 14. The gap 24 can allow the outer frame 12 and the inner frame 14 from physically interfering with one another as the inner frame 14 is rotated, pivoted, tilted, or moved along the outer frame 12 or the first and second upright members 16A, 16B in a first direction D1 or a second direction D2.

The outer frame 12 can be open, at least partially open, or not fully obstructed at the first outer end 22A, the second outer end 22B or both so that the inner frame 14 can be moved in the first direction D1 as the user, such as a child, grows in height. An inner frame 14 that is adjustable in the first direction D1 can help keep an eye level line E of the inner frame at the eye level of the user. For example, a user can initially set the inner frame such that the initial eye level line E matches or approximates the eye level of the user, such as a length of the user's pupils as measured from the respective tops of the user's feet or the floor. As the user grows in height and the eye level of the user also increases in the first direction D1, the inner frame 14 can be moved in the first direction D1 so that the eye level of the user is still generally coincident with the eye level line E of the inner frame 14. If the user passes the inspirational device 10 to a second user who is shorter in height, the inner frame 14 can be moved in the second direction D2 to reset the initial eye level line E of the inner frame 14 to match or approximate the eye level of the second user. Alternatively, the outer frame 12 can eliminate or modify the cross member 18 so that the inner frame 12 has clearance between the first outer frame end 22A or other portions of the outer frame 12 adjacent to the first outer frame end 22A such that the inner frame 14 has clearance to move in the second direction D2. Alternatively, the outer frame 12 can be a simple, weighed base and the inner frame 14 can telescope or otherwise move in both opposed first and second directions D1, D2.

A remote control can be physically attached to the outer frame 12, electrically connected to the outer frame, or both. A remote control can be physically attached to the inner frame 14, electrically connected to the inner frame 14, or both. The remote control can include buttons or selections that permit a user to operate the interactive reflection device or inspiration device 10 without touching any portions of the outer and inner frames 12, 14. The buttons or selections can be extra large buttons, have Braille markings, other indicia, etc. The remote control can permit a user to stay in bed, in a wheelchair, etc. while operating the inspirational device 10.

As noted above, the inspirational device 10 is adjustable in height is advantageous because the inspirational device 10 can grow in height as a user grows in height and can be configured to then be reset to accommodate a second user. For example, the inner frame 14 can be configured to manually slide along the first upright member 16A, the second upright member 16B or both. Adjustment of the inner frame 14 can be facilitated by holes, blind through holes, through holes, rails, power rails, slots 52, etc. A power rail is described in U.S. Pat. No. 7,503,522, hereby incorporated by reference in its entirety. Slots 52 can be defined in one or both first and second upright members 16A, 16B. Where holes, rails, power rails, or slots 52 are used, optional, re-installable respective covers 54 can be used to access the holes, rails, power rails or slots 52. Holes might be easier than the ladder-type slots 52 shown in FIG. 1 when electrical wires and power or electrical cord 56 or both are carried only to the inner frame 14. The inner frame 14 can be removably fixed to the outer frame 12 by threaded fasteners, non-threaded fasteners, hollow fasteners that can also be conduits for electrical wires or electrical connectors, pins 52A, etc. The fasteners or pins 52A can respectively extend into both the outer frame 12 and the inner frame 14. Alternatively, the inner frame 14 can have a first pluggable power cord, the outer frame 12 can have an electrical socket configured to receive the first pluggable power cord. The inner frame 14 can be movable with respect to the outer frame 12, such as be a motor, motorized pullies, weights, etc.

Pins 52A can be moveable with respect to the outer frame 12 or the inner frame 14. The outer frame 12 and the inner frame 14 can define a first height or length when the inner and outer frames 14, 12 are positioned generally parallel to one another or when the inner and outer frames 14, 12 each both substantially lie in, along or parallel to a common plane. The outer frame 12 and the inner frame 14 can define a second height or length when the inner and outer frames 14, 12 are positioned generally parallel to one another or when the inner and outer frames 14, 12 each both substantially lie in, along or parallel to a common plane. The first height can be greater than, less than or equal to the second height. The first length can be greater than, less than or equal to the second length.

A reflective body or an at least partially reflective body, such as a mirror 26, can be fixedly connected to at least a portion of the inner frame 14. The mirror 26 can be fixedly disposed at least partially within the perimeter of the inner frame 14. The mirror 26 can be substantially planar. The mirror 26 can include at least one at least one mirror image region 28, such as a reflective region 28A. The reflective region 28A and the mirror image region 28, either alone or in combined area, can be up to and including 40%, up to and including 50%, up to and including 60%, up to and including 70%, up to and including 80%, up to and including 90% or up to an including 100% of a total surface area or a total reflective area of the mirror 26. The reflective region 28A can be constructed fully or in part as a conventional mirror or can be constructed completely or in part as a two-way mirror. The reflective region 28A can be defined as a region of the mirror 26 that reflects light back to a user.

The inspirational device 10 can further include at least one display region 30. The at least one display region 30 can be carried by a surface that produces or presents a mirror image, such as a mirror 26. The inspirational device 10 can include a first illuminated frame 14 configured to be positioned adjacent to mirror image region 28, reflective region 28A, a display region 30, etc. The display region 30 can be devoid of a reflective surface or reflection region 28. An image or message or picture or other first indicia can be displayed within the display region 30 by at least one display monitor 32. The at least one display monitor 32 can be fixedly engaged to the mirror 26, such as a rear surface of the mirror 26. The display monitor 32 can be coincident with the display region 30. The display monitor 32 can be configured to display an image or message or mirror image to a user of the inspirational device 10. An image or message or greeting or affirmation or other pictures, text or first indicia can further include a graphical representation of a bouncing ball or other second indicia that moves along the image, message, greeting, affirmation, pictures, text or first indica. The display monitor 32 can be constructed of liquid crystal display (LCD), a light emitting diode display (LED), or other suitable display.

The mirror 26 or inner frame 14 can further include at least one touch region 34. The touch region 34 can be defined by or can be carried by at least one touchscreen monitor 36. The touchscreen monitor 36 can be fixedly engaged to the rear surface of the mirror 26 or can be positioned in a cutout in the mirror 26. Exemplary touchscreen monitors 36 are commercially available from AIBECY SA (7 Inch HD IPS Capacitive Touchscreen Display 1024×600 Resolution Small Portable Monitor), EEEkit (3.5-inch Touchscreen Support 320×480 Monitor), etc.

The touch region 34 can be configured to gather input from a user of the inspirational device 10. The touch region 34 of the mirror 26, a switch or signal 60, interface button 40 or other indictor can be annotated with third indicia, such as "Happy" or some similar emotion label and fourth indicia, such as "Sad" or some other emotion label (as discussed later.) The reflective region 28 of the mirror 26, the at least one display region 30, and the at least one touch region 34 can at least partially overlap or can both be separate and distinct.

The outer frame 12, the inner frame 14 (as shown) and/or the mirror 26 or can include an illuminated section or illuminated sections, such as by lights 38. The lights 38 can circumscribe at least approximately 50 percent to at least 100 percent of a periphery of the mirror 26 or mirror image region 28 or reflective region 28A. The lights 38 can be static lights, sound reactive bulbs, LEDs, or other lights. As described herein, sound reactive lights can be configured to increase or decrease in luminosity in response to an external sound or can be configured to brighten or dim in synchronization with an external sound. For example, the lights 38 can include LED Strip Lights, TSV Music Sync Christmas Tape Lights, 5050 RGB Waterproof Rope Lights with APP, Remote, Voice Bluetooth Control, for TV Bedroom Party Outdoor Décor, commercially available from WOWPARTS, Monster Sound Reactive LEG Light Strips, commercially available from JEM ACCESSORIES, Inc., etc. The lights 38 can be configured to mimic or replicate a rainbow or one or more colors of a rainbow, i.e., any one or more colors of red, orange, yellow, green, blue, indigo, and violet. Alternatively, the lights 38 can be the colors of a peacock plume feather or any other color or colors visible to the human eye. The outer frame 12, the inner frame 14, or both, instead of having rainbow colors, can have an illuminated or non-illuminated cloud, sunrise/sunset, beach, princess, undersea, or other age-appropriate or selected motif.

One or more star-shaped interface buttons 40 can be positioned on or adjacent to or over the lights 38. One or more of the star-shaped interface buttons 40 can illuminate or can be non-illuminating and/or can be physically attached, electrically attached or both to respective on-off buttons 50, power, switch, or signal 60, or interface buttons 40. One or more star-shaped interface buttons 40 can be disposed on or within or adjacent to the outer frame 12 or disposed on or in within or adjacent to the inner frame 14. One or more star-shaped interface buttons 40 can be illuminated or can twinkle. Alternatively, the inner frame 14 can define one or more pivoting doors that cover other respective on-off, switches, electrical switches or interface buttons that can be selected by the user, such as a child.

An audio system can include at least one speaker 42 and optionally one or both of at least one microphone 48 and at least one audio input jack. The speaker 42, the microphone 48 and/or audio input jack can be disposed on, in or adjacent to any one of the outer frame 12 or the inner frame 14. The speaker 42 can be any device that can turn an analog or digital signal into an audible sound, such as a dynamic enclosure speaker, an electrostatic speaker, a horn-type speaker, a planar-magnetic speaker, a BLUETOOTH speaker, a soundbar, etc. The microphone 48 can convert sound waves into a corresponding electrical audio signal.

A camera 44 can be carried by the outer frame 12, the inner frame 14 or both. In additional or alternatively, a smart phone and/or a camera mount can be positioned on the outer frame 12, the inner frame 14 or both.

The interactive reflection device or inspirational device 10 can have other interface buttons 40 and corresponding electrical switches or signals in addition to those that can be associated with respective the star-shaped interface buttons 40. The interface buttons 40 can include a backlight, such as a white backlight. The interface buttons 40 can be configured to turn on or turn off depending on user input and device status. Examples of interface buttons 40 can include a power on-off button 50 and at least one or more of a "Happy" interface button 40, a "Sad" interface button 40, an "Angry" interface button 40, a "Lonely" interface button 40, a song interface button 40, a story interface button 40, an affirmation interface button 40, a bed time story interface button 40, a lullaby interface button 40, a game interface button 40, etc. When the on-off power switch 50 is pressed, an associated electrical switch or signal 60 can activate, power on or power off electronics within the inspirational device 10. When another interface button 40 is pressed, current activity can be suspended, and the selected content can begin.

The story interface button 40 can define a square shape, a star shape or any other shape and can further include fifth indicia, such as a book icon. When the story interface button is pressed a pre-recorded story can play from an internal or external library.

The song interface button 40 can define a triangular shape, a star shape or any other shape and can further include sixth indicia, such as a musical note icon. When the song interface button 40 is pressed a pre-recorded song can play from an internal or external library.

The affirmation interface button 40 can define an oval shape, a star shape or any other shape and can further include seventh indicia, such as a sun or cloud icon. When the affirmation interface button 40 is pressed a pre-recorded affirmation can play from an internal or external library.

The games interface button 40 can define a circle shape, a star shape or any other shape can further include eighth indicia, such as a hand or game controller icon. When the game interface button 40 is pressed a pre-recorded game can be played from an internal or external library.

The bedtime story interface button 40 can define a crescent moon shape, a star shape or any other shape and can further include nineth indicia, such as a book icon. When the affirmation interface button 40 is pressed a pre-recorded bedtime can play from an internal or external library.

The lullaby story interface button 40 can define a star shape or any other shape and can further include tenth indicia, such as a "ZZZZ" icon. When the lullaby interface button 40 is pressed a pre-recorded bedtime can play from an internal or external library.

The outer frame 12, the inner frame 14 or both can be hollow to accommodate electrical components such as the data processing unit 46. The data processing unit 46 can include or can be part of a Raspberry Pi computer, a ODROID XU4 computer, a UDOO BOLT V8 computer, etc. The data processing unit 46 can be pre-programmed with WI-FI enabled software to interface with a WI-FI connected artificial intelligence cloud-based operation system that can display multimedia. The data processing unit 46 can include a processor and a non-transitory computer-readable medium having data stored therein that represents software executable by the processor. The non-transitory computer-readable medium can include program instructions that record or determine if a user indicates that the user is either happy, sad or some other emotional state.

The data processing unit 46 can be electrically connected to internal or external memory, such as a memory chip, an external hard drive, a thumb drive, a flash memory drive, a smart phone. Internal memory, external memory or both can store audio, video or mixed audio and video data, such as musical songs with or without accompanying words, spoken stories, etc. Alternatively, the data processing unit 46 can be electrically connected to a live data feed through BLUETOOTH, WI-FI, etc. The data processing unit 46 can also be electrically connected to one or more of the display region 30, the display monitor 32, the touchscreen monitor 36, the lights 38, a respective electrical or mechanical signal switch or signal 60 positioned under a corresponding star-shaped interface button 40, the microphone 48, the speaker 42, the camera 44, etc. Camera 44 can be electrically connected to memory storage.

The data processing unit 46, which can include a processor and a non-transitory computer-readable medium having data stored therein that represents software executable by the processor, as discussed above, can be configured to receive user input from the at least one of the touch region 34, an interface button 40, the camera 44, the microphone 48, an electrical or mechanical switch or signal 60 under a corresponding star-shaped interface button 40, a second microphone 48 attached to the lights 38, and an on/off power switch 50. The data processing unit 46 can be further configured to generate output to the at least one display monitor 32, to display an image or message to the user, and to the at least one audio speaker 42, to play an audio message to the user. In an alternative embodiment, the data processing unit 46 can further include an interface panel. The interface panel can be configured to allow user input through wired or wireless means (not shown) to allow for greater user customization of the inspirational device 10. The data processing unit 46 can be powered by a power supply. The power supply can be configured to supply energy to the display regions 30, the touch region or regions 34, the data processing unit 46, and the speaker 42. The power supply can be disposable batteries, rechargeable batteries, a DC adapter, or the like, but is preferably an AC wall adapter.

The internal or external memory can be configured to store buffered or pre-recorded audio or visual content which is then converted into audible sound by the speaker 42. Alternatively, audio content, video content or both can be live broadcast or live streamed through the display monitor 32 or the speaker 42.

In operation, the inspirational device 10 or data processing unit 46, can sit dormant. An at least one of an on-off power switch 50, a motion sensor, an option FOB or key, facial recognition, an optional light sensor, a voice sensor or voice pattern sensor, a fingerprint sensor, an interface button, a switch, the microphone 48, a vibration sensor, etc. can be used to automatically or semi-automatically power on or activate or wake up the inspirational device 10. Once the inspirational device 10 is activated, audio content, such as a script, video content, or both can play automatically.

One possible, non-limiting script can be, "Hey. You in mirror. Do you know that you are special? Yes, you are special in so many ways. No matter what anyone else says, you are special. Let us say words that make us feel special. Ready? I love myself (Pause for user to repeat "I love myself.") I like myself. (Pause for user to repeat "I like myself.") I love myself (Pause for user to repeat "I love myself.") I am BEAUTIFUL! (Pause for user to repeat "I am BEAUTIFUL.") I am SWEET! (Pause for user to repeats "I am SWEET!")."

Another possible, non-limiting script can be, [with enthusiasm and excitement]: "Hello, I am (Inserted Name). I am feeling (happy, great, or sad—can be randomized) today! How are you feeling today? Happy?" (A star-shaped interface button with a smiling face icon can illuminate and twinkle.) [in a happy sounding voice]: "Press the star button." If no star-shaped interface button 40 is pressed, the script can continue [sad sounding voice]"Are you sad?" (A star-shaped interface button 40 with a sad or frowning face icon can illuminate and twinkle.) If/when the user presses the star-shaped interface button 40 with a sad or frowning face, the interactive reflection device or inspirational device 10 can automatically switch to selections of stories, songs, affirmations, and humor designed to cheer the user up and elevate their mood. [Cheerfully]"I'm sorry to hear that you're sad today! Let us see if we can cheer you up, okay? Would you like to hear a story?" (A star-shaped interface button with a picture of a book can illuminate and twinkle.) "Press the star book button." After a pause or if no book interface button is selected, "What about a song?" (A star-shaped interface button with a musical note can appear illuminate and twinkle.) "Songs are nice! Would you like to hear a song? Press the musical star button." After a pause or if no song interface button is selected, "I have a great idea! Let us say some affirmations together. I will say one and you repeat after me!" (A star-shaped interface button with a child looking in a mirror can illuminate and twinkle.) After a pause, "Would you like to hear something funny?" (A star-shaped button with a child laughing can illuminate and twinkle.) "Would you like that instead? "Press the child button." If the use is preparing for bed, he/she can press a star-shaped interface button for lullabies or a crescent moon shaped button for bedtime stories on their own without any audio greeting. As stated earlier, interface buttons can take any geometric shape and can have any type of corresponding indica or icon.

The data processing unit 46 or a processor and a non-transitory computer-readable medium having data stored therein that represents software executable by the processor can include steps or instructions that prevent the script from automatically advancing until after the user repeats recently presented phrase or phrases. Stated another way, in one embodiment, the script will not advance unless the data or audio content or visual content presented to the user is repeated back to the inspirational device 10. To assist a user, the script can appear on one or more of the display monitor 32, on the mirror, and/or on the touchscreen monitor 36. A graphical representation of a bouncing ball or other second indicator can move over text as the text is read aloud. The text can be read aloud by the inspirational device 10, the user or both. Audio content or visual content such as written text or written affirmations can be available in more than one language, such as English, Spanish, Chinese, Tagalog, Vietnamese, French/French Creole, Arabic, Korean, Russian, German, Hindi, Bengali, Marathi, Telugu, etc. Language can be selected through in initial setup menu, the at least one touch region, digital or analog I/O ports, etc. Audio content can further include Bible verses, rhymes, etc.

In another embodiment, the inspirational device 10 can ask the user to select or press the "Happy", "Sad" or "Cheer Me Up" interface buttons 40 and a respective, corresponding mechanical or electrical switch or signal 60, etc. Once the appropriate interface button 40 is selected, pressed, or activated by the user, the user can then be prompted to select one of the other interface buttons 40. At any point that the inspirational device 10 is powered on, the lights or LEDs can illuminate, an illuminated star-shaped interface button 40 can sparkle or both.

A user can use the "Happy" and "Sad" interface buttons 40 to indicate his/her current emotional state. When the "Happy" interface button 40 is selected or indicated, audio data, video data or both that the user can see or hear through the inspirational device 10 can be limited to a first group of content, such as only uplifting or congratulatory subject matter. Conversely, if the "Sad" interface button 40 is selected or indicated, audio data, video data or both that the user can see or hear through the inspirational device 10 can be limited to a second group of content, subject matter that attempts to cheer up the user. Stated another way, the interface buttons 40 can censor other content. For example, when the "Happy" interface button is selected, the inspirational device 10 can play "You're Simply the Best" by Tina Turner but be prevented from playing "Don't Worry, Be Happy" by Bobby McFerrin. Conversely, if the user is in a melancholy mood, the inspirational device 10 can be prevented from playing upbeat audio or visual content until mood-changing content is presented first to a user. When any interface button 40 is pressed by a user, the respective pressed interface button 40 can backlight, can remain backlit or can stop being backlit. Any current activity of the inspirational device 10 can remain uninterrupted. The inspirational device 10 can store emotion interface button selections for future content selection or a report to parents if the "Sad" or "Cheer Me Up" or "Lonely" interface buttons 40 are pressed over a certain trend, such as over the course of a few consecutive days, a week, a few consecutive weeks, etc.

As a general summary, embodiments described herein can include an inspirational device 10 that can include a first part, such as an outer frame 12 or illuminated outer frame and a second part, such as in inner frame or illuminated inner frame 14. The second part can move with respect to the first part. The second part can pivot with respect to the first part. The second part can slide along a portion of the first part or can telescope from the first part. The outer frame 12 can include or can further include a first upright member 16A. The outer frame 12 can include or can further include a second upright member 16B. The outer frame 12 can include or can further include a first leg 20A. The outer frame 12 can include or can further include a second leg 20B. The second part can be or can define an inner frame 14. The inner frame 14 can include or can carry the mirror image region 28 or reflective region 28A, such as a mirror 26. The inner frame 14 or the mirror 26 can include a display region 30. The inner frame 14 or the mirror 26 can further include a display monitor 32. The inner frame 14 or the mirror 26 can further include a touch region 34. The inner frame 14 or the mirror 26 can include a touchscreen monitor 36.

The inner frame can include lights 38, such as sound activated lights. The lights 38 can circumscribe at least approximately 50 percent to at least 100 percent of a periphery or circumference of one or more of the inner frame 14, mirror 26, the mirror image region 28 or the reflective region 28A. The inner frame 14 or the lights 38 can include at least one illuminated star-shaped interface button 40. The inspirational device 10 can include the microphone 48. The inspirational device 10 can include a camera 44. The inspirational device 10 can include the data processing unit 46. The inspirational device 10 can include at least two switches or signals 60. Each of the at least two switches or signals 60 can be connected to a single interface button 40 or can each be connected to a respective interface button 40. A respective one of the at least two switches or signals 60 can be configured to restrict, in conjunction with a processor and non-transitory computer-readable medium have data stored therein that represents software executable by the processor, visual, audio and/or video content presented to the user. Written text or audible text can be available or can be presented to the user in at least two different languages. Presented written text or presented audible text can be configured to automatically stop unless the user repeats a selected portion of the presented written text or the presented audible text. A specific emotion or specific emotions of the user can be recorded as a function of time or over a specific measure of time.

An inspirational device 10 can include a processor and a non-transitory computer-readable medium having data stored therein that represents software executable by the processor, wherein the non-transitory computer-readable medium comprises program instructions that records or determines if a user indicates that the user is either happy or sad. The program instructions can be configured to automatically restrict user content if the user is happy. The program instructions can be configured to automatically restrict user content if the user is sad.

Figure 3:
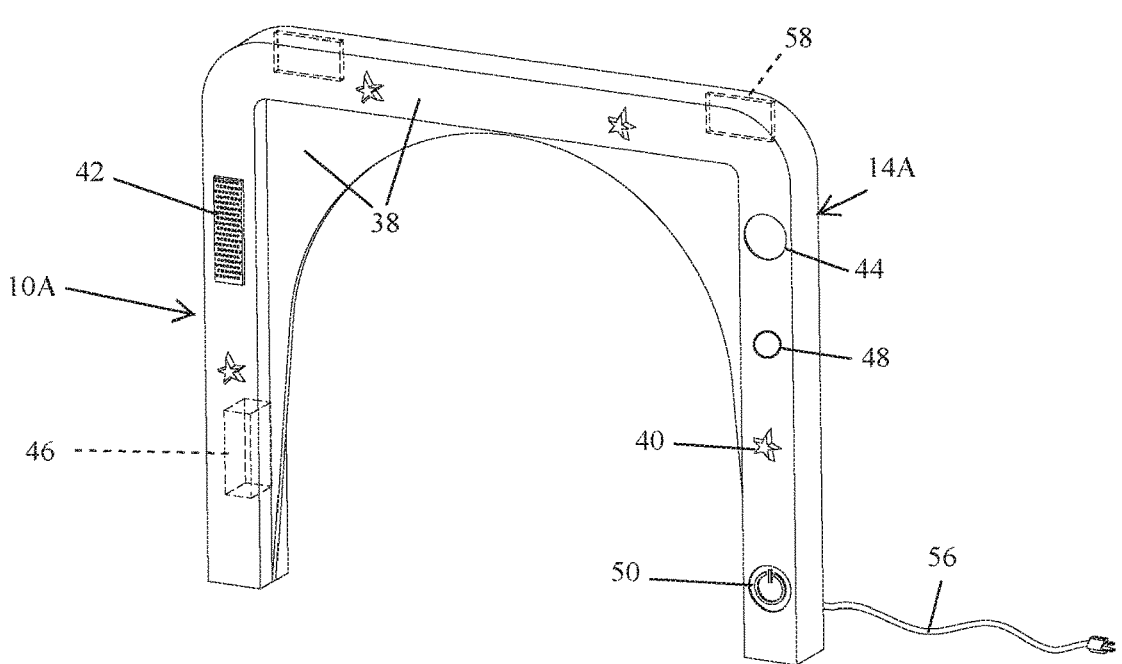
FIG. 3 is a perspective front view of a second embodiment interactive reflective device or inspirational device described herein.
Figure 4:
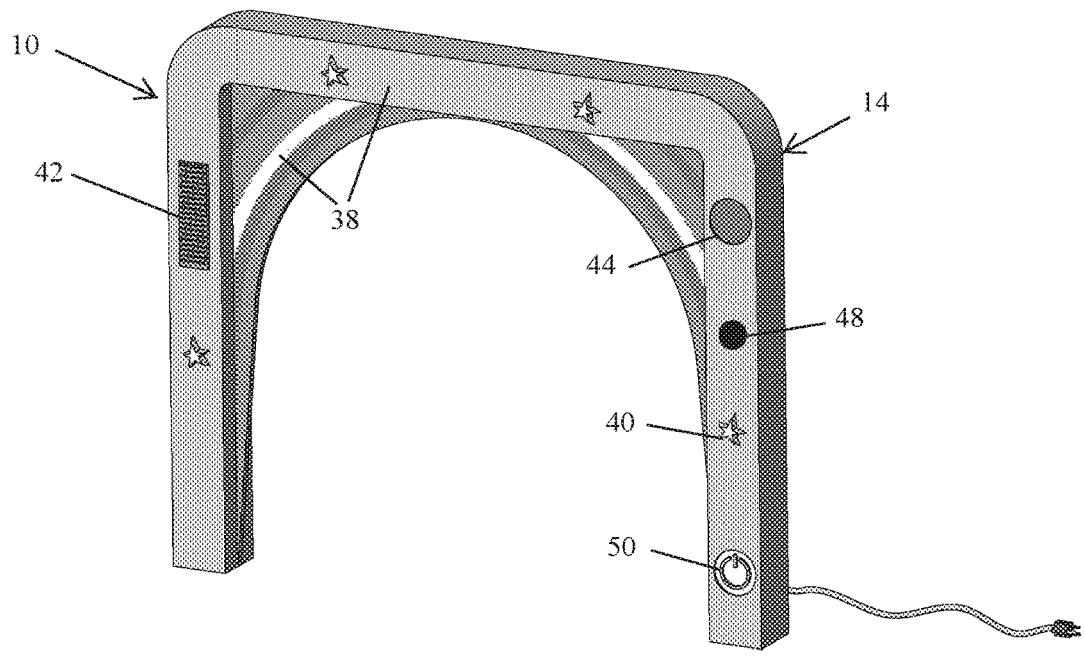
FIG. 4 is a perspective front grayscale view of the second embodiment interactive reflective or inspirational device described herein.

As shown in FIGS. 3 and 4, the present disclosure is not limited to a piece of furniture. A second embodiment interactive reflective device or inspirational device 10A, hereinafter called inspirational device 10A, can be positioned adjacent to an already owned mirror, such as a mirror configured to sit on a floor, attach to a dresser, etc. For example, second embodiment inspirational device 10A can include an inner frame, such as first illuminated frame 14A, configured to be positioned adjacent to the mirror image region of an existing mirror, such as reflective region 28A of the existing mirror. The first illuminated frame 14A can include at least one switch or signal 60 or interface button 40. A processor and a non-transitory computer-readable medium having data stored therein that represents software executable by the processor can be carried by the first illuminated frame 14A. When the indicator switch or signal 60 is engaged, the processor can save respective first data that equates to a selection of a positive emotional feeling or saves respective second data that equates to a negative emotional feeling. A benefit of inspirational device 10A is that it can be sold separately and attached to an existing mirror using hangers 58. This reduces cost to create an intermediate price point. Electrical cord 56 can be physically attached, electrically attached or both to the first illuminated frame 14A.

Summarizing both embodiments, inspirational device 10, 10A can include a first illuminated frame 14A configured to be positioned adjacent to and/or removable from a mirror image region 28. The inner frame 14 or the first illuminated frame 14A can each include at least one indicator switch or signal 60. The first illuminated frame 14A can be configured to be separable from the mirror image region 28 without modifying the mirror image region 28 or its respective first illuminated frame 14, first non-illuminated frame or other frame or physical support. The first illuminated frame 14A can be made from a material selected from the group comprising rigid, self-standing material, flexible, foldable material, or both. The software executable by the processor 46 can automatically restrict further audio content, visual content or both, or further types of audio content or visual content, depending on the value of the first data or the second data. The software executable by the processor 46 can automatically suggests further audio content, visual content, or both depending on the value of the first data or the second data. Audio content, visual content, or both can be automatically stopped from being presented until a user repeats a previously presented portion of content. The first illuminated frame 14A can include lights 38, such as sound activated lights.

The inspirational device 10, 10A can further include the processor 46 and a non-transitory computer-readable medium having data stored therein that represents software executable by the processor 46. When the at least one switch or signal 60 is engaged, pushed, or energized, the processor 46 can be configured to save respective first data that equates to a selection of a positive emotional feeling or saves respective second data that equates to a selection of a negative emotional feeling of a user, such as a child.

The inspirational device 10, 10A can be configured to not be connected to the Internet or connected to the Internet. The inner frame 14 can include a display monitor 32. The inner frame 14 can include a touch region 34. The inner frame 14 can include a touchscreen monitor 36. The inner frame can circumscribe at least approximately 25 percent to at least 50 percent of a periphery of the mirror image region 28. The first illuminated frame 14, 14A can further include at least one illuminated star-shaped interface button 40 physically connected, electrically connected or both to the at least one switch or signal 60, such as an indicator switch. One or more of the inspirational device 10, 10A, the inner frame 14, and the first illuminated frame 14A can include the microphone 48. One or more of the inspirational device 10, the inner frame 14, and the first illuminated frame 14A can include a camera 44. The outer frame 12 can include two parallel, spaced apart upright members 16A, 16B.

An interactive reflective device or inspirational device 10 can include an outer frame 12 configured to sit on the floor or other horizontal surface, an inner frame 14 configured to attach to the outer frame 12 or sit on the floor or another horizontal surface, or a first illuminated frame 14A config- ured to at least partially circumscribe the mirror image region 28 of an existing mirror 26. The interactive reflective device or inspirational device 10 can include a first illumi- nated frame 14. The first illuminated frame 14 can that include a mirror 26. The first illuminated frame 14 can be positioned between the two parallel, spaced apart upright members 16A, 16B.

The first illuminated frame 14 can be configured to move with respect to the outer frame 12 such that when the first illuminated frame 14 and the outer frame 12 both substan- tially lie in or substantially parallel to a first plane, a first overall height of the inspirational device 10 can increase when the first illuminated frame 14 is moved in a first direction and a second overall height of the interactive reflective device decreases when the first illuminated frame 14 is moved in a second direction. The first illuminated frame 14A can pivot or rotate with respect to the outer frame 12. The first illuminated frame 14A can add additional, such as automatically, emotionally positive visual content to an image presented in or generated in a mirror image region 28 of the mirror 26, within the circumference of the first illuminated frame 14. Emotionally positive visual content can be added, such as automatically, to the mirror image region 28 carried by the illuminated inner frame 14A. The interactive reflective device or inspirational device 10 can include a processor and a non-transitory computer-readable medium having data stored therein that represents software executable by the processor. The software can automatically prevent, such as without user intervention, script, visual content, audio content or any combination from automati- cally advancing until after a user repeats a phrase, phrases or visual content, audio content or both recently, such as within the past thirty seconds, sixty seconds, etc. presented to a user, such as a child. A graphical depiction of a bouncing ball or other second indicator can move over text presented on the display monitor 32 as the text is read aloud by a user.

While the disclosure has been described with reference to exemplary embodiments, it will be understood by those skilled in the art that various changes may be made, and equivalents may be substituted for elements thereof without departing from the scope of the disclosure. In addition, many modifications may be made to adapt a particular system, device, or component thereof to the teachings of the disclo- sure without departing from the essential scope thereof. Therefore, it is intended that the disclosure is not limited to the embodiments disclosed for conducting this disclosure, but that the disclosure will include all embodiments falling within the scope of the appended claims.

Any element or element described herein can be used in combination with any other element or elements described herein. The terminology used herein is for the purpose of describing embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, ele- ments, and/or components, but do not preclude the presence or addition of one or more other features, integers, steps, operations, elements, components, and/or groups thereof. Monolithic can mean a single, uniform whole or a single, rigid, uniform whole.

The description of the present disclosure has been pre- sented for purposes of illustration and description but is not intended to be exhaustive or limited to the disclosure in the form disclosed. Many modifications and variations will be apparent to those of ordinary skill in the art without depart- ing from the scope of the disclosure. The described embodi- ments were chosen and described to best explain the prin- ciples of the disclosure and the practical application, and to enable others of ordinary skill in the art to understand the disclosure for various embodiments with various modifica- tions as are suited to the particular use contemplated.

I claim:

1. An inspirational device comprising:
a first frame configured to be positioned adjacent to a mirror image region, the first frame including at least two interface buttons; and
a processor and a non-transitory computer-readable medium having data stored therein that represents program instructions executable by the processor, wherein when one of the at least two interface buttons is engaged, the program instructions record or determine respective first data that equates to a selection of a positive emotional feeling, when another one of the at least two interface buttons is engaged, the program instructions record or determine respective second data that equates to a negative emotional feeling, and the program instructions executable by the processor auto- matically restrict further content depending on a value of the first data or a value of the second data or the program instructions executable by the processor auto- matically suggest further content depending on a value of the first data or a value of the second data.

2. The inspirational device of claim 1 wherein the first frame is configured to be separable from the mirror image region without modifying the mirror image region or its respective mirror frame.

3. The inspirational device of claim 1 wherein the first frame is illuminated and is made from a material selected from the group comprising rigid, self-standing material, or flexible, foldable material.

4. The inspirational device of claim 1 wherein the mirror image region is a reflective portion of a mirror.

5. The inspirational device of claim 1 further comprising one or more of a display monitor, a mirror, and a touchscreen monitor wherein script appears on one or more of the display monitor, the mirror, and the touchscreen monitor.

6. The inspirational device of claim 1 wherein audio content, visual content or both are automatically stopped from being presented until a user repeats a previously presented content.

7. The inspirational device of claim 1 wherein the inspi- rational device is configured to not be connected to the Internet.

8. The inspirational device of claim 1 wherein the first frame is illuminated and further comprises sound activated lights.

9. The inspirational device of claim 1 further comprising a mirror, wherein the first frame or the mirror further comprises a display monitor.

10. The inspirational device of claim 1 further comprising a mirror, wherein the first frame or the mirror further comprises a touch region.

11. The inspirational device of claim 1 further comprising a mirror, wherein the first frame or the mirror further comprises a touchscreen monitor.

12. The inspirational device of claim 1 wherein the first frame circumscribes at least approximately 25 percent to at least 50 percent of a periphery of the mirror image region.

13. The inspirational device of claim 1 wherein at least one of the at least two interface buttons further comprises at least one illuminated, star-shaped, interface button physically connected, electrically connected or both to an indicator switch.

14. The inspirational device of claim 1 further comprising a microphone.

15. The inspirational device of claim 1 further comprising a camera.

16. An inspirational device comprising:

an outer frame configured to sit on the floor, the outer frame includes two parallel, spaced apart upright members; and an illuminated inner frame that includes a mirror, the illuminated inner frame positioned between the two parallel, spaced apart upright members;

wherein the illuminated inner frame moves with respect to the outer frame such that when the outer frame and the illuminated inner frame both substantially lie in or substantially parallel to a first plane, a first overall height of the inspirational device increases when the illuminated inner frame is moved in a first direction and a second overall height of the inspirational device decreases when the illuminated inner frame is moved in a second direction.

17. The inspirational device of claim 16 wherein the illuminated inner frame pivots or rotates with respect to the outer frame.

18. The inspirational device of claim 17 wherein additional, emotionally positive visual content is added, such as automatically, to a mirror image region carried by the illuminated inner frame.

19. The inspirational device of claim 18 further comprising a processor and a non-transitory computer-readable medium having data stored therein that represents software executable by the processor, wherein the software automatically prevents script from automatically advancing until after a user repeats a phrase or phrases.

20. The inspirational device of claim 19, wherein a bouncing ball or other second indicator can move over text as the text is read aloud.

21. An inspirational device comprising:

a first illuminated frame configured to be positioned adjacent to a mirror image region, the first illuminated frame including at least one indicator switch; and a processor and a non-transitory computer-readable medium having data stored therein that represents software executable by the processor, wherein when the at least one indicator switch is engaged, the processor saves respective first data that equates to a selection of a positive emotional feeling or saves respective second data that equates to a negative emotional feeling and the first illuminated frame circumscribes at least approximately 25 percent to at least 50 percent of a periphery of the mirror image region.

22. An inspirational device comprising:

a first illuminated frame configured to be positioned adjacent to a mirror image region, the first illuminated frame including at least one indicator switch; and a processor and a non-transitory computer-readable medium having data stored therein that represents software executable by the processor, wherein when the at least one indicator switch is engaged, the processor saves respective first data that equates to a selection of a positive emotional feeling or saves respective second data that equates to a negative emotional feeling and the illuminated frame further comprises at least one illuminated, star-shaped, interface button physically connected, electrically connected or both to the indicator switch.

\* \* \* \* \*